US010243370B2

(12) United States Patent
Garces et al.

(10) Patent No.: US 10,243,370 B2
(45) Date of Patent: Mar. 26, 2019

(54) SYSTEM AND METHOD FOR INTEGRATING ENERGY STORAGE INTO MODULAR POWER CONVERTER (71) Applicant: GENERAL ELECTRIC COMPANY, Schenectady, NY (US)

(72) Inventors: Luis Jose Garces, Niskayuna, NY (US); Rui Zhou, Niskayuna, NY (US); Zhi Zhou, Selkirk, NY (US); Di Zhang, Niskayuna, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 343 days.

(21) Appl. No.: 14/960,729

(22) Filed: Dec. 7, 2015

(65) Prior Publication Data
US 2017/0163043 A1 Jun. 8, 2017

(51) Int. Cl.
*H02J 5/00* (2016.01)
*H02J 3/38* (2006.01)
*H02J 3/32* (2006.01)
*H02M 1/15* (2006.01)
*H02M 7/483* (2007.01)
*H02J 3/30* (2006.01)

(52) U.S. Cl.
CPC .............. *H02J 3/387* (2013.01); *H02J 3/30* (2013.01); *H02J 3/32* (2013.01); *H02M 1/15* (2013.01);
(Continued)

(58) Field of Classification Search
CPC .. H02J 3/387; H02J 3/32; H02M 7/44; H02M 7/4807; H02M 7/49; H02M 2007/4835
(Continued)

(56) References Cited
U.S. PATENT DOCUMENTS 7,269,037 B2 * 9/2007 Marquardt ............ H02M 5/271
363/132
7,960,871 B2 * 6/2011 Dommaschk ......... H02M 7/483
307/151
(Continued)

FOREIGN PATENT DOCUMENTS

CN        103326939 A      9/2013
WO        2014/032701 A1   3/2014
WO     WO 2014032701 A1 * 3/2014 ............ H02M 3/158

OTHER PUBLICATIONS

"Energy Storage Modules," ABB Power and Productivity for a better world, May 31, 2012, 37 pages.
(Continued)

*Primary Examiner* — Ryan Jager
(74) *Attorney, Agent, or Firm* — GE Global Patent Operation; Nitin Joshi (57) ABSTRACT A system for integrating energy storage into a modular power converter includes at least one energy storage unit coupled to a first converter for converting a first direct current (DC) voltage of the at least one energy storage unit into a first high frequency alternating current (AC) voltage. At least three phase legs of the modular power converter generate three phase AC voltages. Each phase leg includes a plurality of switching modules connected in series. The switching modules have a plurality of fully controllable semiconductor switches, an energy storage device, and a second converter coupled to the respective energy storage device for converting a second DC voltage of the energy storage device into a second high frequency AC voltage. In the system, three similarly positioned switching modules of the three phase legs form one power unit. Further, a high frequency transformer is provided which has at least one primary winding connected to the first converter and at least three secondary windings, each connected to the second
(Continued)

converter of each of the three similarly positioned switching modules. A controller is configured to regulate at least one electrical parameter of the modular power converter.

25 Claims, 5 Drawing Sheets (52) U.S. Cl.
CPC .... *H02M 7/483* (2013.01); *H02M 2007/4835* (2013.01)

(58) Field of Classification Search
USPC .......................................................... 307/82
See application file for complete search history.

(56) References Cited

U.S. PATENT DOCUMENTS

| | | | |
|---|---|---|---|
| 7,969,755 B2 | 6/2011 | Davies et al. | |
| 8,233,300 B2* | 7/2012 | Dommaschk | H02M 7/483 363/127 |
| 9,325,251 B2* | 4/2016 | Bousfield, III | H02J 5/00 |
| 9,479,073 B2* | 10/2016 | Chen | H02M 1/08 |
| 9,479,075 B2* | 10/2016 | Garces | H02M 7/487 |
| 9,515,568 B2* | 12/2016 | Zhang | H02M 7/219 |
| 2012/0032512 A1* | 2/2012 | Aiello | H02M 7/49 307/43 |
| 2013/0003424 A1 | 3/2013 | Song et al. | |
| 2014/0092661 A1* | 4/2014 | Zhang | H02M 7/5152 363/131 |
| 2014/0152109 A1 | 6/2014 | Kanakasabai et al. | |

OTHER PUBLICATIONS

T. Ericsen et al., "Power Electronics—Electrical Energy Conversion Machines & Power Electronic Building Blocks," 3rd Annual Solid State Energy Conversion Alliance (SECA) Workshop, Office of Naval Research, Apr. 24, 2002, pp. 1-49.

International Search Report and Written Opinion issued in connection with corresponding PCT Application No. PCT/US2016/065131 dated Sep. 25, 2017.

* cited by examiner

SYSTEM AND METHOD FOR INTEGRATING ENERGY STORAGE INTO MODULAR POWER CONVERTER

STATEMENT REGARDING FEDERALLY SPONSORED RESEARCH & DEVELOPMENT

This invention was made with Government support under contract number N00014-14-C-0103 awarded by the Office of Naval Research. The Government has certain rights in the invention.

BACKGROUND

Embodiments of the invention relate power converters and more specifically to a system and a method for integrating energy storage into modular multi-level power converter.

Energy storage has becoming an increasingly important key element for a variety of power system applications, including motive/transportation and stationary/power grid applications. Traditionally, electrical energy storage such as batteries and ultracapacitors are designed and well suited for direct current (DC) applications that provide active power and load support. Often times, DC to DC power converter will be needed in coupling the energy storage module(s)/element(s) to a DC bus in the power system. For an alternating current (AC) application (e.g., supporting AC loads), the DC bus will then be tied to an AC power system/grid via a DC/AC inverter. This requires multiple stages of power conversion, associated with power conversion efficiency/loss at each stage.

For the DC/AC power conversion, modular multi-level converters (MMCs) are becoming more and more utilized in particular for high and medium voltage applications due to its modular and scalable characteristics. MMCs also have high reliability through the use of redundant modules and high output power quality (e.g., less total harmonic distortion/THD) with little or no filters, thereby reducing system weight and volume or increasing power density.

When MMC is integrated with additional energy storage units, such as batteries and/or super-capacitors/ultracapacitors, it reduces the number of power conversion stages and thus increases overall system efficiency. In addition, when MMC is combined with multiple (or hybrid) energy storage modules in one system, it provides multiple system functions such as uninterrupted power supply (UPS) and transient assist/smoothing functions.

The challenge of using energy storage units (e.g., supercapacitors) within the MMC is the limitation in the amount of current ripple that the energy storage units (e.g., ultracapacitors) can accept without significantly overheating; reducing their useful life; and/or significantly oversizing the energy storage elements. For instance, when the module ultracapacitors are used for a 60 Hz application, they have to conduct significant ripple currents with 60 Hz, 120 Hz, and other frequency content. This oversized energy storage capacity to handle the ripple currents do not support active power/load, and significantly increase/penalize system volume and weight.

For these and other reasons, there is a need for improved system for integrating energy storages with modular multi-level converters.

BRIEF DESCRIPTION

In accordance with an embodiment of the present technique, a system for integrating energy storage into a modular power converter is presented. The modular converter includes at least one energy storage unit coupled to a first converter for converting a first direct current (DC) voltage of the at least one energy storage unit into a first high frequency alternating current (AC) voltage. The system also includes at least three phase legs of the modular power converter for generating three phase AC voltages, wherein each phase leg includes a plurality of switching modules connected in series. Each switching module comprises a plurality of fully controllable semiconductor switches, an energy storage device and a second converter coupled to the respective energy storage devices for converting a second DC voltage of the energy storage device into a second high frequency AC voltage. One power unit is formed by three similarly positioned switching modules of the three phase legs. The system further includes a high frequency transformer having at least one primary winding connected to the first converter and at least three secondary windings, each connected to the second converter of each of the three similarly positioned switching modules. The system also includes a controller configured to regulate at least one electrical parameter of the modular power converter.

In accordance with another embodiment of the present technique, a method for integrating energy storage into a modular power converter is provided. The method includes coupling at least one energy storage unit to a first converter, wherein the first converter converts a first direct current (DC) voltage of the energy storage unit into a first high frequency alternating current (AC) voltage. The method also includes generating three phase AC voltages from at least three phase legs of the modular power converter, each phase leg including a plurality of switching modules connected in series, wherein each of the switching module includes a plurality of fully controllable semiconductor switches, an energy storage device and a second converter coupled to the respective energy storage device for converting a second DC voltage of the energy storage device into a second high frequency AC voltage. The method further includes forming one power unit from the three similarly positioned switching modules of the three phase legs. Furthermore, the method includes providing a high frequency transformer having at least one primary winding and at least three secondary windings between the power unit and the first power converter, wherein the primary winding is connected to the first power converter and each of the three secondary windings is connected to the second converter of each of the three similarly positioned switching modules. The method also includes regulating at least one electrical parameter of the modular power converter

DETAILED DESCRIPTION

Unless defined otherwise, technical and scientific terms used herein have the same meaning as is commonly understood by one of ordinary skill in the art to which this disclosure belongs. The terms "first", "second", and the like, as used herein do not denote any order, quantity, or importance, but rather are used to distinguish one element from another. Also, the terms "a" and "an" do not denote a limitation of quantity, but rather denote the presence of at least one of the referenced items. The term "or" is meant to be inclusive and mean one, some, or all of the listed items. The use of "including," "comprising" or "having" and variations thereof herein are meant to encompass the items listed thereafter and equivalents thereof as well as additional items. The terms "connected" and "coupled" are not restricted to physical or mechanical connections or couplings, and can include electrical connections or couplings. The connections may include direct connections. Furthermore, the terms "circuit" and "circuitry" and "controller" may include either a single component or a plurality of components, which are either active and/or passive and are connected or otherwise coupled together to provide the described function.

The embodiments of the present technique propose a new power conversion topology that cancels or eliminates the current ripples going through the energy storage units used in conjunction with modular power converters and also provide safety and protection via galvanic isolation.

The technique is to combine the energy storage units from the three legs that are at the same relative position (in other words, similarly positioned) within phase arms into one by integrating a direct current (DC) transformer (DC to DC converter a high frequency transformer) with 4 sets of windings. Three of the transformer windings will be coupled to three switching modules from three phase legs and the fourth transformer winding will couple to the energy storage unit. Thus, the energy storage units will only carry the sum of the balanced three 120 degrees phase shifted modules currents, which when added will cancel the alternating current (AC) ripple currents and result in a DC current going through the energy storage element.

Figure 1:
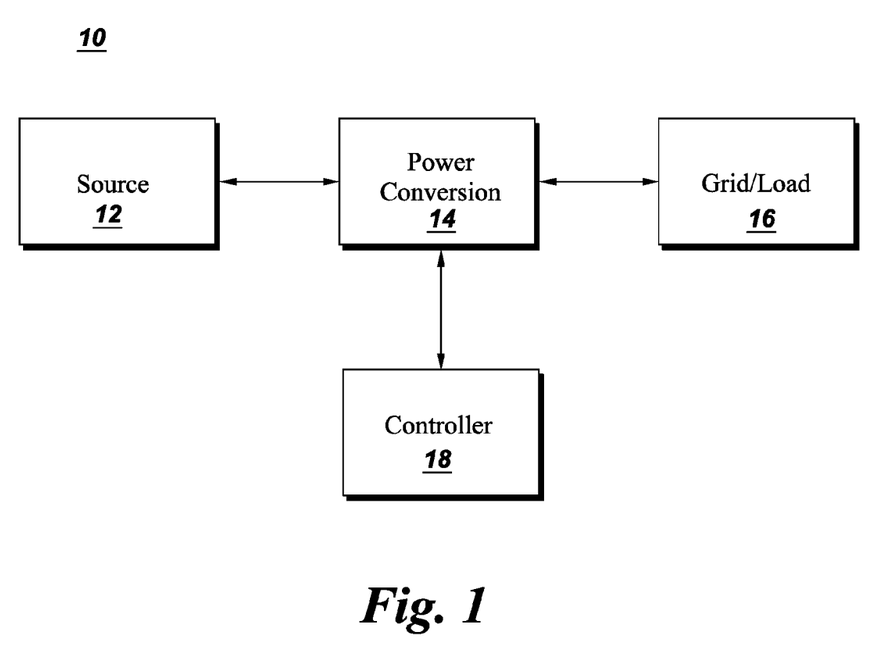
FIG. 1 is a diagrammatical representation of a system for power conversion.

Turning now to the drawings, by way of example in FIG. 1, a system 100 for converting power is depicted. In one embodiment, the system 10 for converting power may include a source 12, a power converter 14, and a grid/utility/load 16. The term source, as used herein, is used to refer to a renewable power source, a non-renewable power source, a generator, a grid, and the like. Also, the term load, as used herein, may be used to refer to a grid, an electrical appliance, and the like. In addition, the power converter 14 may be a modular power converter. In one embodiment, the source 12 may be operatively coupled to a first terminal (not shown) of the power converter 14. A second terminal (not shown) of the power converter 14 may be operatively coupled to the load 16. The first terminal and the second terminal may be alternatively employed as an input terminal or an output terminal of the power converter 14. The term operatively coupled, as used herein, may include wired coupling, electrical coupling, magnetic coupling, and the like.

Also, the system 10 may include a controller 18. The controller 18 may be configured to control the operation of the power converter 14, in one embodiment. By way of example, the controller 18 may be configured to control the operation of the power converter 14 by controlling switching of a plurality of semiconductor switches of the power converter 14. Furthermore, in one embodiment, the system 10 may also include other circuit components (not shown) such as, but not limited to, a transformer, a circuit breaker, an inductor, a compensator, a capacitor, a rectifier, a reactor, a filter, and the like. In one embodiment, of the present technique, an energy storage unit may be coupled to the power converter 14 or may be a part of it as will be explained in greater detail with respect to FIGS. 2 and 4.

Figure 2:
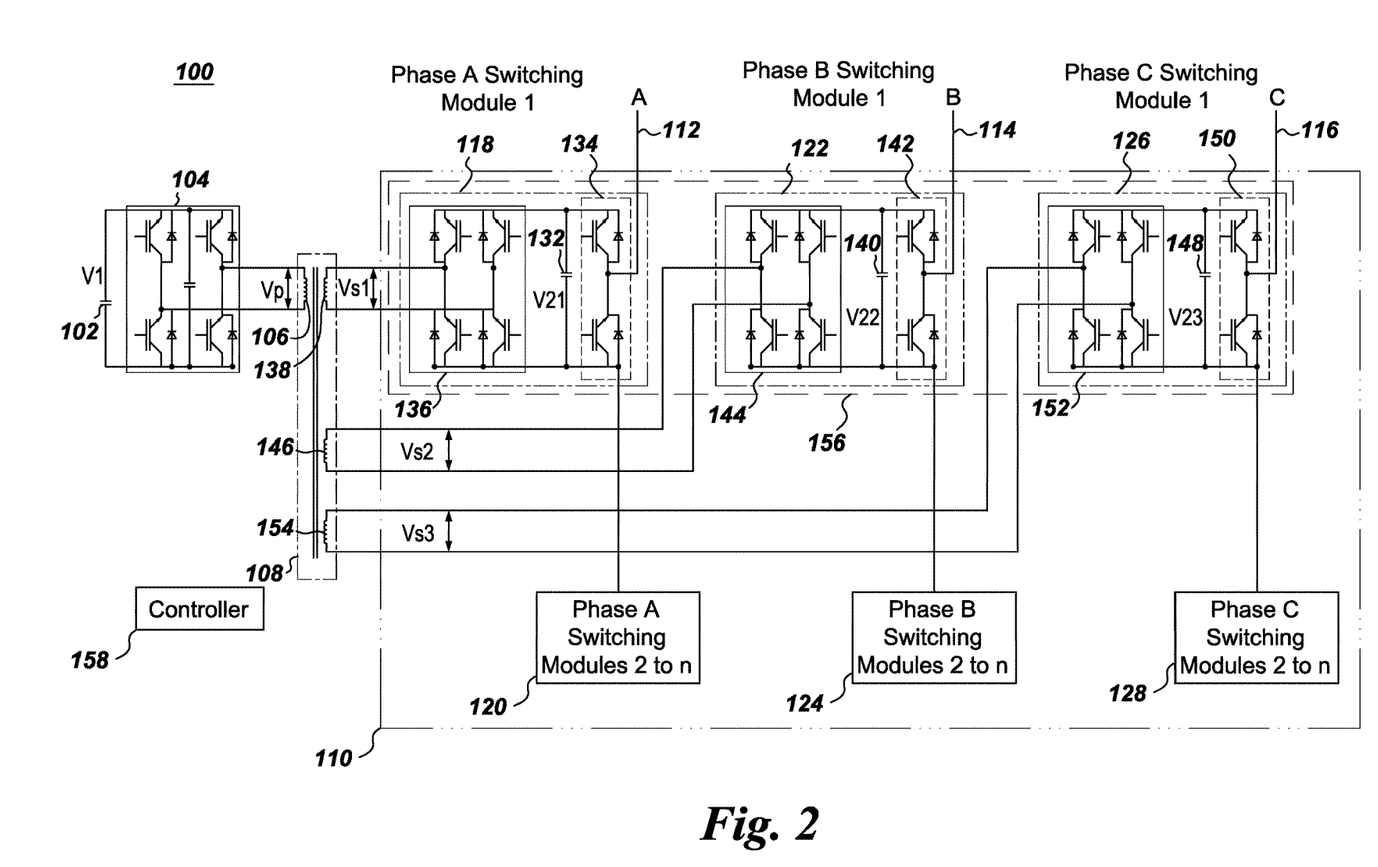
FIG. 2 is a diagrammatical representation of a system for integrating an energy storage unit into a modular power converter, in accordance with an embodiment of the present technique.

FIG. 2 shows a system 100 for integrating an energy storage unit into a modular power converter, in accordance with an embodiment of the present technique. The system 100 includes an energy storage unit 102 coupled to a first converter 104. The energy storage unit 102 may include batteries, flywheels, ultracapacitors, or supercapacitors. The batteries may be of type such as Li-ion, sodium-chloride, Lithium Titanium (LTO), Lithium Nickel Manganese Cobalt Oxide (NMC), or metal-air to name a few. The energy storage unit may further include fuel cells or other capacitors such as film capacitors or electrolytic capacitors. Further, the first converter 104 includes a DC to high frequency AC converter which converters a first DC voltage V1 of the energy storage unit 102 into a first high frequency AC voltage Vp. The first converter 104 includes a full bridge converter having two legs, each having two fully controllable semiconductor switches whose terminals are connected in series. The fully controllable semiconductor switches may include an insulated gate bipolar transistor (IGBT), a metal oxide semiconductor field effect transistor (MOSFET), a field effect transistor (FET), a gate turn-off thyristor, an insulated gate commutated thyristor (IGCT), an injection enhanced gate transistor (IEGT), a silicon carbide based switch, a gallium nitride based switch, a gallium arsenide based switch, or equivalents thereof. The full bridge converter can reverse the polarity of output voltage (i.e., Vp) and output current. The high frequency voltage Vp is applied across a primary winding 106 of a high frequency transformer 108. The term 'high frequency' refers to any frequency greater than 5 kHz.

Furthermore, the system 100 includes a modular power converter 110 having three phase legs 112, 114 and 116 for phases a, b and c respectively. Phase leg 112 includes a first switching module 118 and switching modules (2 to n) 120, all of which are connected in series. Similarly, phase leg 114 includes a first switching modules 122 and switching modules (2 to n) 124 connected in series. Further, phase leg 116 includes a first switching module 126 and switching modules (2 to n) 128 connected in series.

Switching module 118 includes an energy storage device 132 connected in parallel with a set 134 of two controllable semiconductor switches. The terminals of the two controllable semiconductor switches are connected in series. The terminals of the energy storage device 132 are further connected in parallel with a second converter 136. The second converter 136 includes a DC to high frequency AC converter which converters a second DC voltage V21 of the energy storage device 132 into a second high frequency AC voltage Vs1 applied across a first secondary winding 138 of the high frequency transformer 108. It should be noted that other series connected switching modules (2 to n) 120 of phase leg 112 are similar in structure to switching module 118. Also it should be noted that the series connection of switching modules only refers to terminals of set 134 of two controllable semiconductor switches of switching modules 118, 120 being connected in series. The second voltages Vs1 of switching modules of one phase leg are neither connected in series nor are they connected to the same transformer.

Similar to switching module 118, switching module 122 includes an energy storage device 140 connected in parallel with a set 142 of two controllable semiconductor switches. The terminals of the energy storage device 140 are further connected in parallel with a second converter 144. The second converter 144 includes a DC to high frequency AC converter which converters a second DC voltage V22 of the energy storage device 140 into a second high frequency AC voltage Vs2 applied across a second secondary winding 146 of the high frequency transformer 108.

Further, switching module 126 includes an energy storage device 148 connected in parallel with a set 150 of two controllable semiconductor switches. The terminals of the energy storage device 148 are further connected in parallel with a second converter 152. The second converter 152 includes a DC to high frequency AC converter which converters a second DC voltage V32 of the energy storage device 148 into a second high frequency AC voltage Vs3 applied across a third secondary winding 154 of the high frequency transformer 108.

As with first converter 104, second converters 136, 144 and 152 may include full bridge converters having two legs connected in parallel to energy storage unit 102. Each leg of full bridge converter 104 includes two fully controllable semiconductor switches whose terminals are connected in series. The interconnections of two fully controllable semiconductor switches form an output connection. Further, one side end terminals of phase legs 112, 114 and 116 may be connected to each other and/or another side end terminals may provide three phase AC output voltages. The similarly positioned switching modules of all the phase legs such as first switching modules 118, 122 and 126 of three phase legs 112, 114 and 116 respectively together form one power unit 156 of modular power converter 110. Every energy storage unit integrated with the modular power converter is coupled with one such one power unit. For example, energy storage unit 102 and related first power converter 104 is coupled to power unit 156 via high frequency transformer 108.

The system 100 also includes a controller 158 which controls the operation of first converter 104, second converters 136, 144 and 152 such that voltages V21, V22 and V23 of energy storages devices 132, 140 and 148 may be maintained. As discussed earlier, in one embodiment, first and second converters 104, 136, 144 and 152 may be full bridge converters and therefore, energy may be transferred from energy storage devices 132, 140 and 148 to energy storage unit 102 or from energy storage unit 102 to energy storage devices 132, 140 and 148.

Further, in case of a fault on either energy storage unit 102 or modular power converter 110, the controller may send controls signals to first and second power converters 104, 136, 144 and 152 such that the two converters on either side of the transformer 108 may be isolated. The winding turns ratio of primary winding 106 and secondary windings 138, 146 and 154 may be 1 to 1 or it could be any other turns ratio based on system operation requirement. This flexibility of winding turns ratio helps to select voltages at energy storage devices relatively independent of voltages at energy storage units, while preserving the overall system efficiency. The frequency of voltages Vs1, Vs2, Vs3 and Vp may be higher than 5 kHz.

It should be noted that in another embodiment, transformer 108 may include more than three secondary windings. For example, transformer 108 along with secondary windings 138, 146 and 154 may include at least three more secondary windings for the subsequent similarly positioned switching modules.

The controller 158 further controls at least one electrical parameter of modular power converter 110. The electrical parameter may include output current or output voltage or output power of the modular power converter 110. It should be noted that since the currents in legs 112, 114 and 116 are from three different phases (i.e., phases a, b and c) of the modular converter 110, the currents are 120 degrees phase shifted. These 120 degrees phase shifted currents then flow through the three secondary windings 138, 146 and 154. However, on the primary side there is only one winding which carries sum of these balanced three 120 degrees phase shifted currents. As the sum of 120 degree phase shifted currents is zero, the AC ripple currents will cancel out and only DC current will flow through the energy storage unit 102. It should also be noted that due to the transformer isolation between energy storage unit and the energy storage devices, in one embodiment, the energy storage unit 102 could also be electrically grounded, which could be advantageous if energy storage unit is used in parallel with batteries. As shown in FIG. 2, in one embodiment, the energy storages devices may also be floated.

Figure 3:
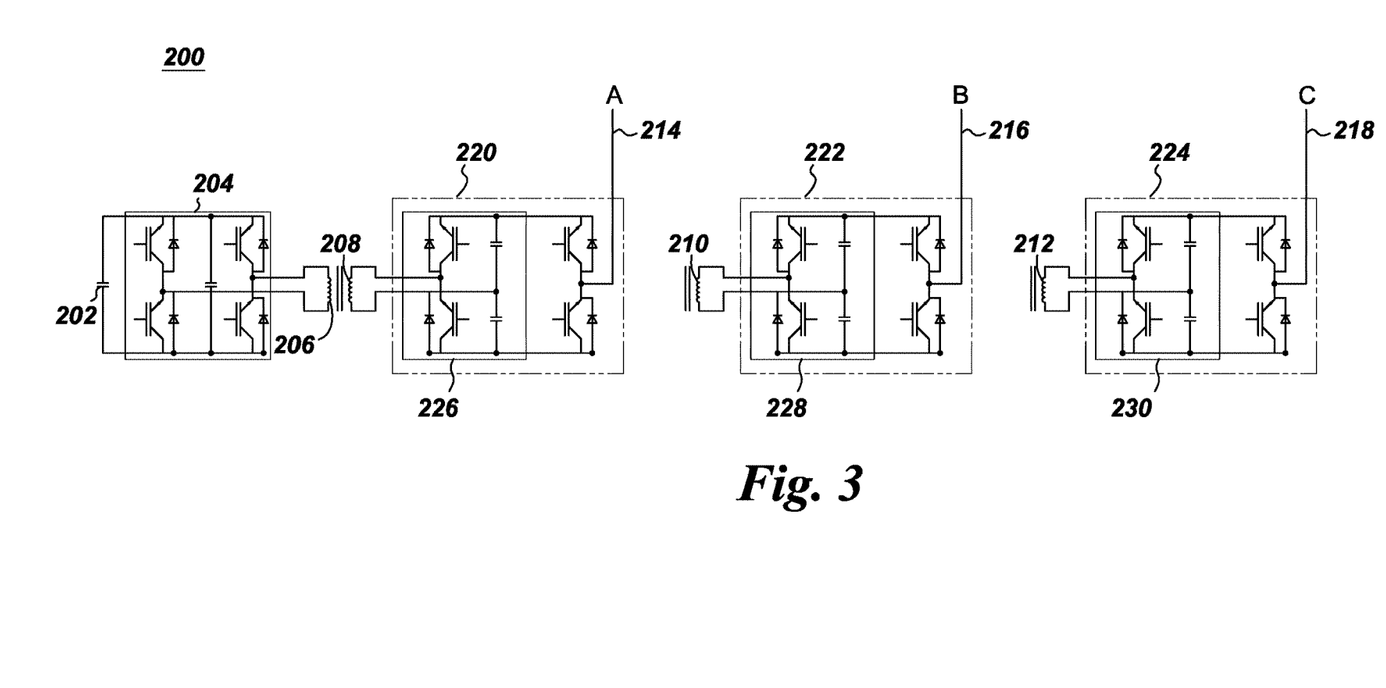
FIG. 3 is a diagrammatical representation of a system for integrating an energy storage unit into a modular power converter, in accordance with another embodiment of the present technique.

FIG. 3 shows a system 200 for integrating an energy storage unit into a modular power converter, in accordance with another embodiment of the present technique. As compared with system 100, system 200 includes half bridge converters for first and second converters instead of full bridge converters. The system 200 includes an energy storage unit 202 coupled to a first converter 204. The first converter 204 includes a half bridge converter having two legs connected in parallel across the energy storage unit 202. One converter leg of converter 204 includes two fully controllable semiconductor switches whose terminals are connected in series and another leg includes two capacitors connected in series. The interconnections of two fully controllable semiconductor switches and two capacitors form two output terminals of converter 204. The half bridge converter 204 can reverse the polarity of output voltage (i.e., Vp) but not of output current. The output high frequency AC voltage of converter 204 is applied across a primary winding 206 of a high frequency transformer. It should be noted that although the primary winding 206 and secondary windings 208, 210 and 212 are shown to be located apart from each other, they are part of a single transformer.

Furthermore, the system 200 three phase legs 214, 216 and 218 of a modular converter. Phase leg 214 includes a plurality of switching modules connected in series but only first switching module 220 is shown herewith for ease of explanation. Similarly, phase leg 216 includes a first switching module 222 and phase leg 218 includes a first switching module 224.

Switching module 220 includes a second converter 226, output terminals of which are connected across secondary winding 208. Similarly, switching module 222 includes a second converter 228, output terminals of which are connected across secondary winding 210 and switching module 224 includes a second converter 230, output terminals of which are connected across secondary winding 212. The second converter 226, 228 and 230 include half bridge converters similar to first converter 204. As with embodiment of FIG. 2, switching modules 220, 222, and 224 also include controllable semiconductor switches connected in series. A controller then controls these first and second converters to maintain voltage across energy storage devices of switching modules 220, 222, and 224.

Figure 4:
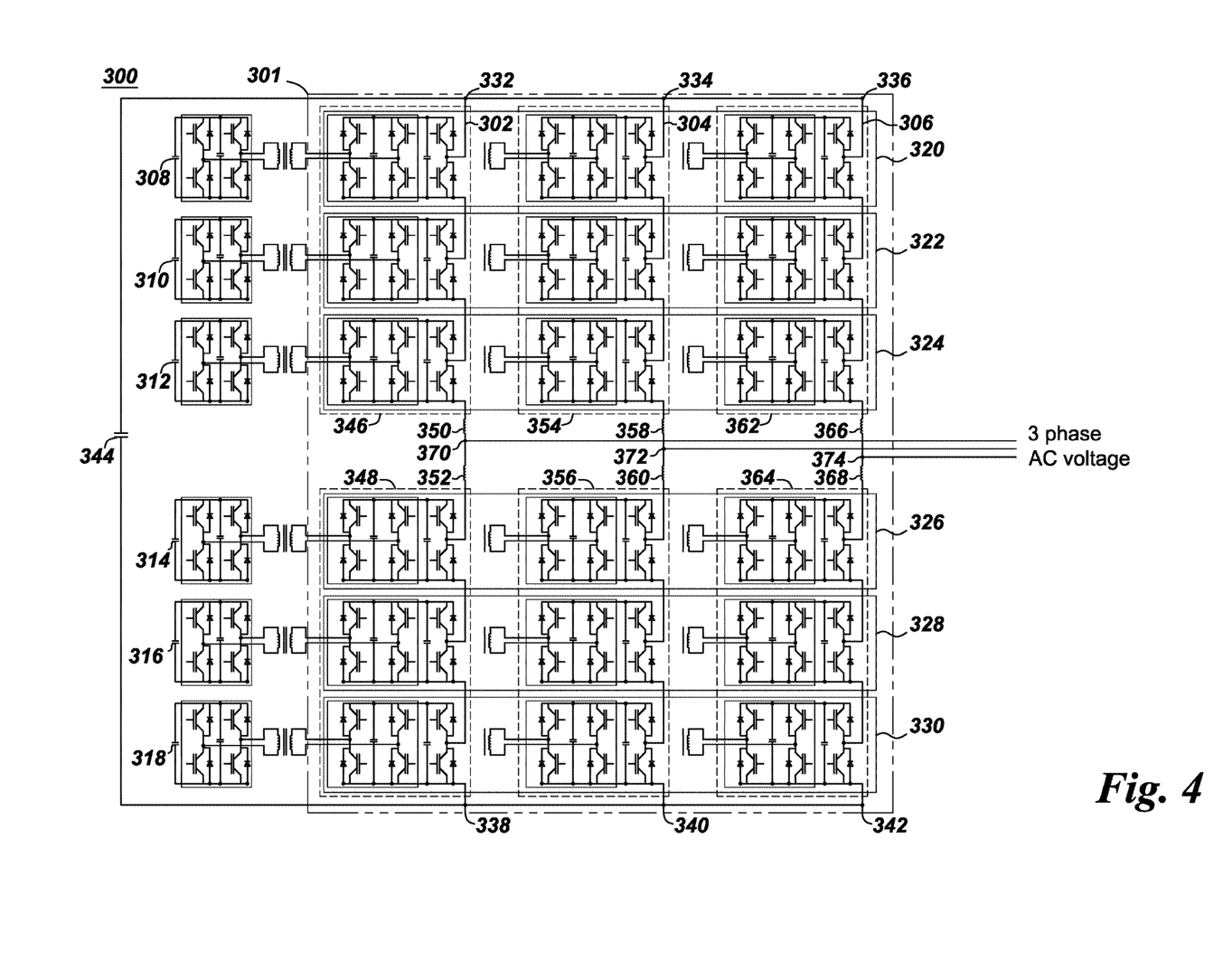
FIG. 4 is a diagrammatical representation of a system for integrating energy storage units into a modular multilevel converter, in accordance with an embodiment of the present technique.

FIG. 4 shows a system 300 for integrating energy storage units into a modular multilevel converter, in accordance with an embodiment of the present technique. System 300 shows three legs 302, 304 and 306 of a modular multilevel converter (MMC) 301, wherein each leg has a plurality of switching modules connected in series. As discussed earlier, the series connection of switching modules here refers to terminals of set of controllable semiconductor switches of switching modules being connected in series. Further system 300 includes energy storage units 308, 310, 312, 314, 316 and 318 which are coupled respectively to power units 320, 322, 324, 326, 328 and 330 of modular multilevel converter via high frequency transformers. As explained earlier, power units 320, 322, 324, 326, 328 and 330 of modular multilevel converter are formed by similarly positioned switching modules of phase legs 302, 304 and 306. For example, in the embodiment shown, every phase leg 302, 304 or 306 has six switching modules connected in series. If the switching modules are numbered 1 to 6 respectively then, number 1 switching modules of all three legs form one power module. Similarly, number 2 switching modules of all three legs form another power module and so on.

The end terminals (i.e., starting terminals 332, 334, 336 and ending terminals 338, 340, 342) of converter phase legs 302, 304 and 306 are connected together. The starting terminals 332, 334, 336 when connected together form a positive DC bus and ending terminals 338, 340, 342 when connected together form a negative DC bus. A DC voltage source 344 is then connected across the positive DC bus and the negative DC bus. The DC voltage source 344 may be a HVDC bipolar line coming from another substation or it may be a DC link capacitor.

The switching modules of every leg 302, 304 or 306 of modular multilevel converter are further separated into a first arm and a second arm. For example, switching modules of phase leg 302 are separated into a first arm 346 and a second arm 348. The first arm 346 and the second arm 348 are connected to each other by inductors 350 and 352 as shown. Similarly, switching modules of phase leg 304 are separated into a first arm 354 and a second arm 356. The first arm 354 and the second arm 356 are connected to each other by inductors 358 and 360. Further, switching modules of phase leg 306 are separated into a first arm 362 and a second arm 364. The first arm 362 and the second arm 364 are connected to each other by inductors 366 and 368. The interconnection points 370, 372 and 374 of first arms 346, 354, 362 and second arms 348, 356, 364 via the respective inductors provide three phase output terminals 370, 372, 374 of modular multilevel converter 301. The terminals 370, 372, 374 may further provide three phase AC voltages to a power grid or a load.

A controller (e.g. controller 158 of FIG. 2) controls the system 300 in such a way that the energy storage devices of switching modules are charged by either DC voltage source or the power grid. As discussed earlier, the controller also controls first converters and second converters such that the voltage of energy storage devices or energy storage units may be controlled. Further, the controller may control the modular multilevel converter in such a way that the three phase output terminals electrical parameters and/or the positive bus and negative bus electrical parameters are regulated.

Figure 5:
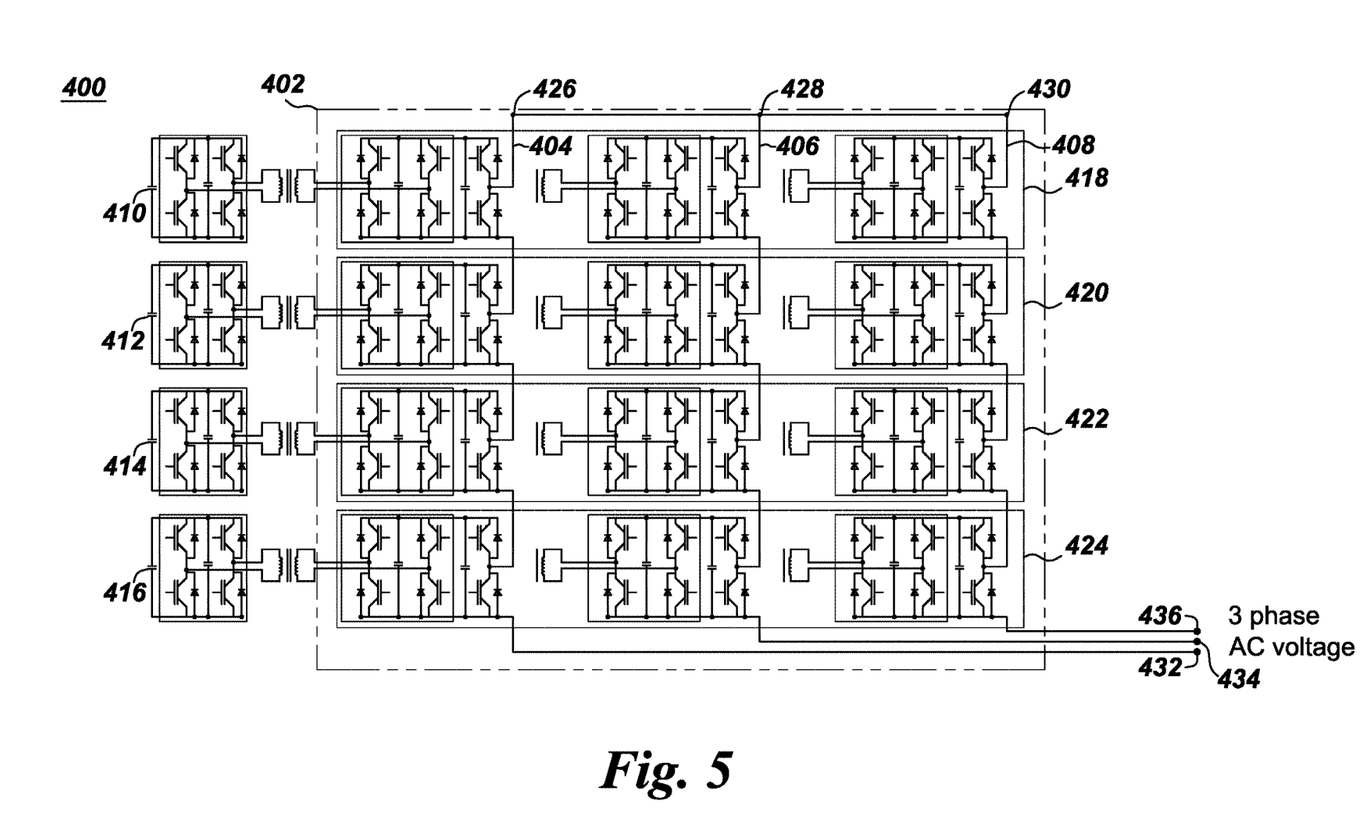
FIG. 5 s a diagrammatical representation of a system for integrating energy storage units into a flexible AC transmission system (FACTs) device, in accordance with an embodiment of the present technique.

FIG. 5 shows a system 400 for integrating energy storage units into a flexible AC transmission system (FACTs) device, in accordance with an embodiment of the present technique. System 400 shows three legs 404, 406 and 408 of a modular converter 402 which may be employed in a FACTs device such as a static compensator (STATCOM). Each leg has a plurality of switching modules connected in series. Further, system 400 includes energy storage units 410, 412, 414 and 416 which are coupled respectively to power units 418, 420, 422 and 424 of modular converter 402 via high frequency transformers. Power units 418, 420, 422 and 424 of modular converter are formed by similarly positioned switching modules of phase legs 404, 406 and 408 respectively.

In the embodiment shown, one side end terminals 426, 428, 430 of converter phase legs 404, 406 and 408 are connected together and form a floating bus. The other side terminals 432, 434 and 436 of converter phase legs 404, 406 and 408 provide three phase AC output terminals of modular multilevel converter 402. The terminals 432, 434 and 436 are further connected to a power grid and the converter 402 can be used to compensate for reactive power or for increasing stability of power grid.

The controller controls the system 400 in such a way that the energy storage devices of switching modules are charged by the power grid. The controller also controls first converters and second converters such that the voltage of energy storage devices or energy storage units may be controlled. Further, the controller may control the modular multilevel converter in such a way that the three phase output terminals electrical parameters and/or the positive bus and negative bus electrical parameters are regulated.

It should be noted that embodiments shown in FIGS. 4 and 5 are only two example applications of the present technique. However, the present technique of integrating energy storage units may also be utilized in any other type of modular converters such as modular embedded multilevel converters and the like.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system for integrating energy storage into a modular power converter, the system comprising:
at least one energy storage unit coupled to a first converter for converting a first direct current (DC) voltage of the at least one energy storage unit into a first high frequency alternating current (AC) voltage;
at least three phase legs for the modular power converter for generating three phase AC voltages, each phase leg comprising:
a plurality of switching modules connected in series, each switching module includes:
a plurality of fully controllable semiconductor switches,
an energy storage device,
a second converter coupled to the respective energy storage device for converting a second DC voltage of the energy storage device into a second high frequency AC voltage,
wherein three similarly positioned switching modules of the three phase legs form one power unit;
a high frequency transformer having only one primary winding connected to the first converter and at least three secondary windings, each connected to the second converter of each of the three similarly positioned switching modules; and
a controller configured to regulate at least one electrical parameter of the modular power converter.

2. The system of claim 1, wherein the at least one energy storage unit includes batteries, supercapacitors, flywheels or fuel cells.

3. The system of claim 1, wherein the first converter and second converter comprise full bridge converters having two legs, each including two fully controllable semiconductor switches whose terminals are connected in series.

4. The system of claim 1, wherein the fully controllable semiconductor switches include an insulated gate bipolar transistor (IGBT), a metal oxide semiconductor field effect transistor (MOSFET), a field effect transistor (FET), a gate turn-off thyristor, an insulated gate commutated thyristor (IGCT), an injection enhanced gate transistor (IEGT), a silicon carbide based switch, a gallium nitride based switch, a gallium arsenide based switch, or equivalents thereof.

5. The system of claim 1, wherein the terminals of fully controllable semiconductor switches are connected in series to connect the plurality of switching modules in series.

6. The system of claim 1, wherein the controller is further configured to regulate voltages of energy storage devices by interchanging energy of energy storage devices and at least one energy storage unit by way of controlling the first and the second converters.

7. The system of claim 1, wherein the controller is further configured to isolate the first and second converters in case of a fault.

8. The system of claim 1, wherein a winding turns ration between the primary winding and the at least three secondary windings is determined based on system requirement.

9. The system of claim 1, wherein the frequency of the first and the second high frequency AC voltage is higher than 5 kHz.

10. The system of claim 1, wherein the at least one electrical parameter of the modular power converter includes output current, output voltage, output power of the modular power converter or voltage of the energy storage device.

11. The system of claim 1, wherein the high frequency transformer cancels out an AC ripple current in the at least one energy storage unit caused due to AC currents in three phase legs.

12. The system of claim 1, wherein the at least one energy storage unit is electrically grounded or floated.

13. The system of claim 1, wherein the first and the second converters include half bridge converters.

14. The system of claim 1, wherein the three phase legs are part of a modular multilevel converter.

15. The system of claim 14, wherein the end terminals of phase legs are connected together to form a positive DC bus and a negative DC bus.

16. The system of claim 15, wherein the plurality of switching modules in each phase leg form a first arm and a second arm connected to each other via inductors.

17. The system of claim 15, wherein the plurality of switching modules in each phase leg form a first arm and a second arm connected to each other via inductors.

18. The system of claim 1, wherein the three phase legs are part of a flexible AC transmission system (FACTs) device.

19. The system of claim 18, wherein the one end terminals of phase legs are connected together to form floating bus and other end terminals provide three phase output AC terminals.

20. A method for integrating energy storage into a modular power converter, the method comprising:
coupling at least one energy storage unit to a first converter, wherein the first converter converts a first direct current (DC) voltage of the energy storage unit into a first high frequency alternating current (AC) voltage;
generating three phase AC voltages from at least three phase legs of the modular power converter, each phase leg including a plurality of switching modules connected in series, wherein each of the switching module includes a plurality of fully controllable semiconductor switches, an energy storage device and a second converter coupled to the respective energy storage device for converting a second DC voltage of the energy storage device into a second high frequency AC voltage;
forming one power unit from the three similarly positioned switching modules of the three phase legs;
providing a high frequency transformer having only one primary winding and at least three secondary windings between the power unit and the first power converter, wherein the primary winding is connected to the first power converter and each of the three secondary windings is connected to the second converter of each of the three similarly positioned switching modules; and
regulating at least one electrical parameter of the modular power converter.

21. The method of claim 20, wherein the at least one energy storage unit includes batteries, flywheels, supercapacitors, or fuel cells.

22. The method of claim 20, wherein the first converter and second converter comprise full bridge converters or half bridge converters or combinations thereof.

23. The method of claim 20 further comprising regulating voltages of energy storage devices by interchanging energy of energy storage devices and energy storage unit via the first and the second converters.

24. The method of claim 20, wherein the phase legs are part of a modular multilevel converter or a flexible AC transmission system device.

25. The method of claim 20 wherein both end terminals of phase legs are connected together to form a positive DC bus or a negative DC bus or one end terminals of phase legs are connected together to form a floating bus and another end terminals form three phase AC output terminals.

* * * * *